(12) United States Patent
Chikahisa

(10) Patent No.: US 8,389,865 B2
(45) Date of Patent: Mar. 5, 2013

(54) TOUCH PANEL

(75) Inventor: Yousuke Chikahisa, Hyogo (JP)

(73) Assignee: Panasonic Corporation, Osaka (JP)

( * ) Notice: Subject to any disclaimer, the term of this patent is extended or adjusted under 35 U.S.C. 154(b) by 134 days.

(21) Appl. No.: 13/169,402

(22) Filed: Jun. 27, 2011

(65) Prior Publication Data

US 2012/0006585 A1 Jan. 12, 2012

(30) Foreign Application Priority Data

Jul. 6, 2010 (JP) .................................. 2010-153588

(51) Int. Cl.
*H05K 1/03* (2006.01)

(52) U.S. Cl. ........ 174/255; 174/256; 361/735; 361/736; 361/742; 361/746; 361/750; 345/173

(58) Field of Classification Search .......... 174/255–259, 174/260–261; 361/728, 729, 735, 736, 742, 361/746–750

See application file for complete search history.

(56) References Cited

U.S. PATENT DOCUMENTS

| 2010/0013786 A1* | 1/2010 | Nishikawa et al. ........... 345/173 |
| 2010/0103126 A1* | 4/2010 | Nakamura et al. ............ 345/173 |
| 2011/0043465 A1* | 2/2011 | Huang et al. .................. 345/173 |
| 2011/0175841 A1* | 7/2011 | Nakamura et al. ............ 345/173 |
| 2011/0255227 A1* | 10/2011 | Murakami ............... 361/679.01 |

FOREIGN PATENT DOCUMENTS

JP 2009-277121 11/2009

* cited by examiner

*Primary Examiner* — Hoa C Nguyen
(74) *Attorney, Agent, or Firm* — Panasonic Patent Center

(57) ABSTRACT

A touch panel includes first and second substrates, and first insulating layer disposed therebetween. The first substrate has, on its bottom surface, a first conductive layer having opposing first and second sides; a first electrode along the first side; and a second electrode along the second side. The second substrate has, on its top surface, a second conductive layer facing the first conductive layer with a predetermined space and having third and fourth sides orthogonal to the first and second sides: a third electrode along the third side; and a fourth electrode along the fourth side. The first insulating layer is frame-like and coats at least part of the first and second electrodes. The first and second electrodes and the first insulating layer together form a decoration part having a color tone to prevent the third and fourth electrodes from being visible when viewed from the first substrate side.

11 Claims, 4 Drawing Sheets

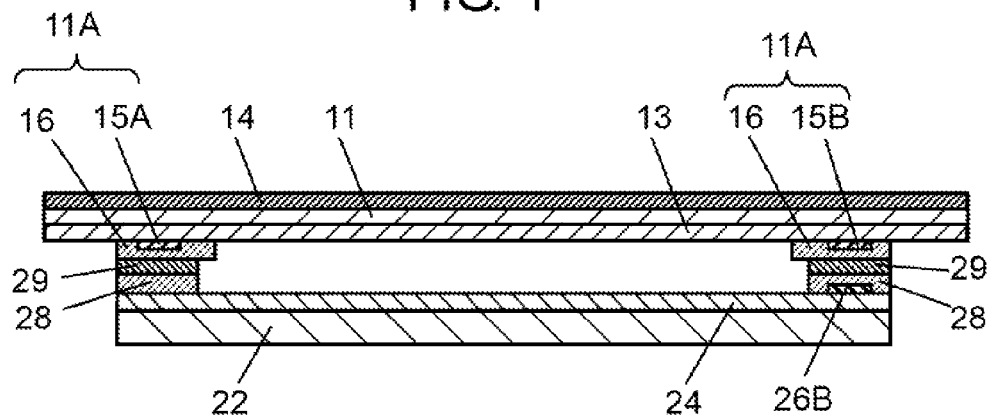
FIG. 1
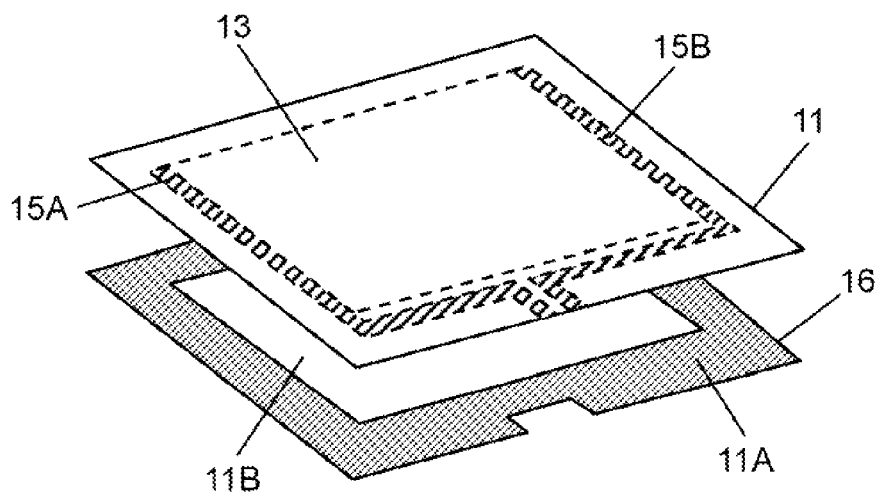
FIG. 2
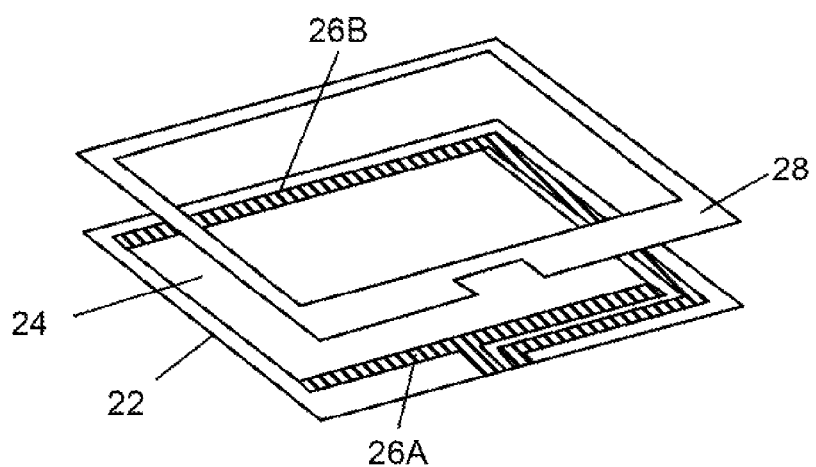

TOUCH PANEL

BACKGROUND OF THE INVENTION

1. Field of the Invention

The technical field relates to a touch panel which is used, as one example, to operate various electronic apparatuses.

2. Background Art

With their increased functionality and diversity in recent years, many electronic apparatuses such as mobile telephones and electronic cameras have been provided with a light-transmitting touch panel. Such a touch panel is installed on the front surface of a liquid crystal display or other display device in these electronic apparatuses. The touch panel allows the user to switch between various functions by touching the panel with a finger, pen or other pointing device while watching the display of the display device through the panel. There is a demand to make such touch panels less costly and more user-friendly.

FIG. 7 is a sectional view of a conventional touch panel, and FIG. 8 is an exploded perspective view of the touch panel. Note that the dimensions of some parts in these drawings are enlarged for clarity. The touch panel includes upper substrate 1 having upper conductive layer 3 on its bottom surface, and lower substrate 2 having lower conductive layer 4 on its top surface. Upper substrate 1 may be made of a light-transmitting film, and lower substrate 2 may be made of light-transmitting glass. Upper conductive layer 3 and lower conductive layer 4 may be made of indium tin oxide, which has light-transmitting characteristics.

Upper substrate 1 has a pair of upper electrodes 5A and 5B, along opposing first and second sides of upper conductive layer 3. Upper electrodes 5A and 5B may be made of silver. Lower conductive layer 4 has third and fourth sides which are orthogonal to the first and second sides of upper conductive layer 3. Lower substrate 2 includes a pair of lower electrodes 6A and 6B along the third and fourth sides. The ends of upper electrodes 5A and 5B extend to the center of the front side of upper substrate 1. The ends of lower electrodes 6A and 6B extend to the center of the front side of lower substrate 2.

Lower conductive layer 4 has dot spacers (not shown) on its top surface. The dot spacers are made of insulating resin, and are arranged with a predetermined space from each other. The touch panel further includes frame-like insulating layers 7 and 8. Insulating layer 7 is formed along the outer periphery of the bottom surface of upper substrate 1, and insulating layer 8 is formed along the outer periphery of the top surface of lower substrate 2. Upper substrate 1 and lower substrate 2 are pasted together along their outer peripheries with adhesive 9 such that upper conductive layer 3 and lower conductive layer 4 face each other with a predetermined space. Adhesive 9 is applied to the bottom surface of insulating layer 7 or the top surface of insulating layer 8.

The touch panel further includes light-transmitting film-like display sheet 10. Display sheet 10 has light-transmitting hard coat layer 10A on its entire top surface. Hard coat layer 10A may be made of acrylic. Display sheet 10 also has light-transmitting part 10B at its center, frame-like decoration part 10C along its outer periphery, and adhesive layer 10D on the bottom surface of decoration part 10C. Decoration part 10C is painted a dark color such as black or gray. Display sheet 10 is pasted on the top surface of upper substrate 1 with adhesive layer 10D.

The touch panel having this structure is installed on the front surface of a liquid crystal display or other display device (not shown), and mounted on an electronic apparatus. The ends of upper electrodes 5A, 5B and the ends lower electrodes 6A, 6B of the touch panel are electrically connected to an electronic circuit (not shown) of the apparatus via, for example, a wiring board or a connector (not shown).

The user touches the top surface of upper substrate 1 to select a desired menu with a finger, pen, or other pointing device while watching the display of the display device disposed on the rear surface of the touch panel through light-transmitting part 10B of display sheet 10. In this case, upper substrate 1 is bent such that the touched part of upper conductive layer 3 comes into contact with lower conductive layer 4.

The electronic circuit sequentially applies voltages across upper electrodes 5A and 5B and across lower electrodes 6A and 6B. The electronic circuit then detects the touched part from the ratio between the sides of upper conductive layer 3 and the sides of lower conductive layer 4 which are orthogonal to upper conductive layer 3. This allows the user to switch between various functions of the apparatus, thereby selecting a desired menu from multiple menus.

It, however, takes time to manufacture the conventional touch panel because of the large number of components. As described above, upper substrate 1 having upper conductive layer 3 and insulating layer 7 on its bottom surface is pasted together with lower substrate 2 having lower conductive layer 4 and insulating layer 8 on its top surface via adhesive 9. In addition, display sheet 10 having hard coat layer 10A and decoration part 10C is pasted on the top surface of upper substrate 1 via adhesive layer 10D.

SUMMARY

The touch panel includes a first substrate, a second substrate, and a first insulating layer disposed between these substrates. The first substrate has, on its bottom surface, a first conductive layer, and first and second electrodes. The first conductive layer has a first side and a second side opposite the first side. The first electrode is formed along the first side and the second electrode is formed along the second side, of the first conductive layer. The second substrate has, on its top surface, a second conductive layer, and a third electrode and a fourth electrode. The second conductive layer faces the first conductive layer with a predetermined space provided therebetween, and has a third side and a fourth side which are orthogonal to the first and second sides. The third electrode is formed along the third side, and the fourth electrode is formed along the fourth side, of the second conductive layer. The first insulating layer is frame-like and coats at least part of the first electrode and the second electrode. The first electrode, the second electrode and the first insulating layer together form a decoration part, which has a color tone in such a manner that the third electrode and the fourth electrode are concealed. More specifically, the decoration part has a color tone to prevent the third electrode and the fourth electrode from being visible when viewed from the first substrate side. In other words, the decoration part is dark colored.

BRIEF DESCRIPTION OF DRAWINGS

FIG. 1 is a sectional view of a touch panel according to an exemplary embodiment.

FIG. 2 is an exploded perspective view of the touch panel according to the exemplary embodiment.

DETAILED DESCRIPTION

Figure 3:
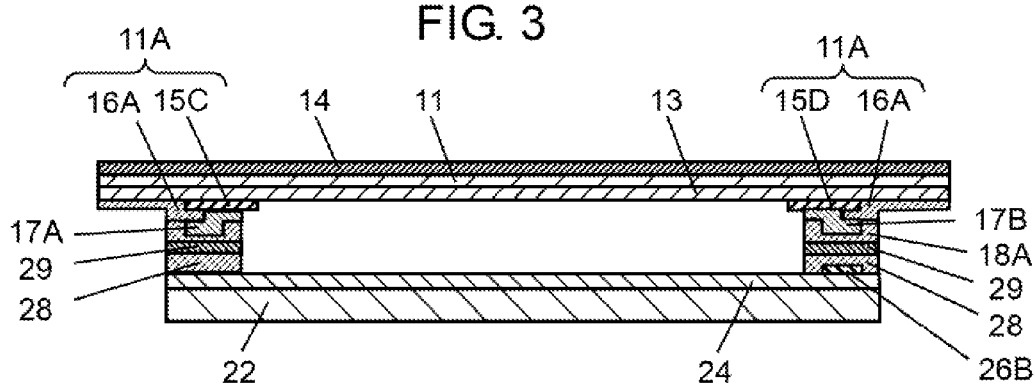
FIG. 3 is a sectional view of another touch panel according to the exemplary embodiment.

FIG. 1 is a sectional view of a touch panel according to an exemplary embodiment, and FIG. 2 is an exploded perspective view of the touch panel. Note that the dimensions of some parts in these drawings are enlarged for clarity.

The touch panel includes upper substrate 11 (first substrate), lower substrate 22 (second substrate), and insulating layer 16 (first insulating layer) disposed between these substrates 11 and 22. Upper substrate 11 has, on its bottom surface, upper conductive layer 13 (first conductive layer), upper electrode 15A (first electrode), and upper electrode 15B (second electrode). Upper conductive layer 13 has a first side and a second side opposite the first side. Upper electrodes 15A and 15B are formed along the first and second sides, respectively. Lower substrate 22 has, on its top surface, lower conductive layer 24 (second conductive layer), lower electrode 26A (third electrode), and lower electrode 26B (fourth electrode). Lower conductive layer 24 faces upper conductive layer 13 with a predetermined space, and has third and fourth sides which are orthogonal to the first and second sides of upper conductive layer 13. Lower electrodes 26A and 26B are formed along the third and fourth sides, respectively. Insulating layer 16 is frame-like and coats part of upper electrodes 15A and 15B. Upper electrodes 15A, 15B and insulating layer 16 together form decoration part 11A, which has a color tone in such a manner that lower electrodes 26A and 26B are concealed. More specifically, decoration part 11A has a color tone to prevent lower electrodes 26A and 26B from being visible when seen from the upper substrate 11 side. In other words, decoration part 11A is dark colored. Decoration part 11A prevents lower electrodes 26A and 26B disposed beneath it from being visible, and allows a logo with the name of the company and the product to be displayed on it. Furthermore, insulating layer 16 may reach the outer periphery of upper conductive layer 13, just like later-described insulating layer 16A shown in FIG. 3.

As described above, upper substrate 11 has upper conductive layer 13 on its bottom surface, whereas lower substrate 22 has lower conductive layer 24 on its top surface. Upper substrate 11 is made of a light-transmitting film such as polyethylene terephthalate, polyethersulfone, or polycarbonate. Lower substrate 22 is made of a light-transmitting film, light-transmitting glass, or other thin materials. Upper conductive layer 13 and lower conductive layer 24 may be formed by sputtering indium tin oxide, tin oxide, or other similar light-transmitting materials.

Upper substrate 11 has light-transmitting hard coat layer 14 on its entire top surface. Hard coat layer 14 is made of insulating resin such as acrylic or silicone. The ends of upper electrodes 15A and 15B, which are formed along the opposing first and second sides of upper conductive layer 13, extend to the center of the front side of upper substrate 11.

Upper electrodes 15A and 15B are dark colored by dispersing various materials into insulating resin such as phenol, polyester, or epoxy. More specifically, dispersing carbon or graphite into the resin makes a black color. Dispersing silver and carbon into the resin makes a gray color. Dispersing silver and pigment such as phthalocyanines into the resin makes a blue or green color. The term "dark color" used for upper electrodes 15A, 15B and insulating layer 16 means a color tone in such a manner that the outer peripheral region of lower substrate 22 are concealed. In other words, upper electrodes 15A, 15B and insulating layer 16 make lower electrodes 26A, 26B and later-described insulating layer 28 invisible.

Frame-like insulating layer 16 is formed by, for example, screen printing along the outer periphery of the bottom surface of upper substrate 11. Insulating layer 16 coats upper electrodes 15A and 15B except for their ends. Insulating layer 16 is dark colored by dispersing, for example, pigment into insulating resin such as polyester or epoxy. It is preferable that insulating layer 16 is the same color as upper electrodes 15A and 15B. Upper electrodes 15A, 15B and insulating layer 16 together form frame-like decoration part 11A along the outer periphery of the bottom surface of upper substrate 11. Upper substrate 11 has light-transmitting part 11B at its center.

As described above, lower conductive layer 24 has the third and fourth sides orthogonal to the first and second sides of upper conductive layer 13. Lower electrodes 26A and 26B are formed along the third and fourth sides, respectively. The ends of lower electrodes 26A and 26B extend to the center of the front side of lower substrate 22. Lower electrodes 26A and 26B may be made of silver or carbon. The touch panel further includes insulating layer 28 (second insulating layer) along the outer periphery of the top surface of lower substrate 22. Insulating layer 28 is frame-like and coats lower electrodes 26A and 26B except for their ends. Insulating layer 28 is made of insulating resin such as polyester or epoxy.

Lower conductive layer 24 has dot spacers (not shown) on its top surface. The dot spacers are made of insulating resin such as epoxy or silicone, and are arranged with a predetermined space from each other. Upper substrate 11 and lower substrate 22 are pasted together along their outer peripheries with adhesive 29 such that upper conductive layer 13 and lower conductive layer 24 face each other with a predetermined space. Adhesive 29 may be acrylic resin or rubber, and is applied to the bottom surface of insulating layer 16 or the top surface of insulating layer 28.

The outer periphery of upper substrate 11 extends outward by 0.5 mm to 5 mm from the outer periphery of lower substrate 22. The inner periphery of insulating layer 16 extends inward by 0.1 mm to 1 mm from the inner peripheries of adhesive 29 and insulating layer 28.

The touch panel having this structure is installed on the front of surface of a liquid crystal display or other display device (not shown), and mounted on an electronic apparatus. The ends of upper electrodes 15A, 15B and the ends of lower electrodes 26A, 26B are electrically connected to an electronic circuit (not shown) of the apparatus via, for example, a wiring board or a connector (not shown).

The user touches the top surface of upper substrate 11 to select a desired menu with a finger, pen, or other pointing device while watching the display of the display device disposed on the rear surface of the touch panel through light-transmitting part 11B of upper substrate 11. In this case, upper substrate 11 is bent such that the touched part of upper conductive layer 13 comes into contact with lower conductive layer 24.

The electronic circuit sequentially applies voltages across upper electrodes 15A and 15B and across lower electrodes 26A and 26B. The electronic circuit then detects the touched part from the ratio between the sides of upper conductive layer 13 and the sides of lower conductive layer 24 which are orthogonal to upper conductive layer 13. This allows the user to switch between various functions of the apparatus, thereby selecting a desired menu from multiple menus.

According to the present exemplary embodiment, dark-colored upper electrodes 15A, 15B and dark-colored insulating layer 16 together form frame-like decoration part 11A along the outer periphery of the bottom surface of upper substrate 11. This allows the touch panel to be assembled with few components only by pasting upper substrate 11 and lower substrate 22 together. More specifically, in the touch panel, the pair of upper electrodes 15A and 15B are dark colored. In addition, frame-like dark-colored insulating layer 16 is formed along the outer periphery of the bottom surface of upper substrate 11. As a result, upper electrodes 15A, 15B and insulating layer 16 together form decoration part 11A along the outer periphery of the bottom surface of upper substrate 11. Decoration part 11A has a color tone in such a manner that lower electrodes 26A, 26B and insulating layer 28 are concealed. In other words, decoration part 11A has a color tone to prevent lower electrodes 26A, 26B and insulating layer 28 from being visible when seen from the upper substrate 11 side. This eliminates the need for other components such as a display sheet having a decoration part, and the trouble of pasting the display sheet on the top surface of upper substrate 11. As a result, the touch panel can be manufactured at low cost.

Upper substrate 11 is slightly larger in size than lower substrate 22 such that the outer periphery of upper substrate 11 extends outward from the outer periphery of lower substrate 22. In this case, the extended part of the bottom surface of upper substrate 11 is pasted on the housing (not shown) of the electronic apparatus, allowing the touch panel to be evenly mounted on the surface of the apparatus.

The inner periphery of insulating layer 16 extends inward from the inner peripheries of adhesive 29 and insulating layer 28. In other words, an inner periphery of insulating layer 16 is smaller than an inner periphery of insulating layer 28. The user sees the display device on the rear surface of the touch panel through light-transmitting part 11B from above upper substrate 11. In this case, dark-colored insulating layer 16 serves as a screen to hide the inner peripheral ends of insulating layer 28 and other components from the user's view. This makes it easier for the user to see the display device on the rear surface and to operate the device. Insulating layers 16 and 28 may alternatively be replaced by a single insulating layer. In this case, decoration part 11A has a color tone in such a manner lower electrodes 26A and 26B are concealed. Thus, decoration part 11A has a color tone to prevent lower electrodes 26A and 26B from being visible when seen from the upper substrate 11 side.

In the above description, frame-like dark-colored insulating layer 16 is formed along the outer periphery of the bottom surface of upper substrate 11 so as to coat dark-colored upper electrodes 15A and 15B except for their ends. It is alternatively possible to stack a plurality of upper electrodes and a plurality of insulating layers as shown in FIGS. 3 and 4.

Figure 4:
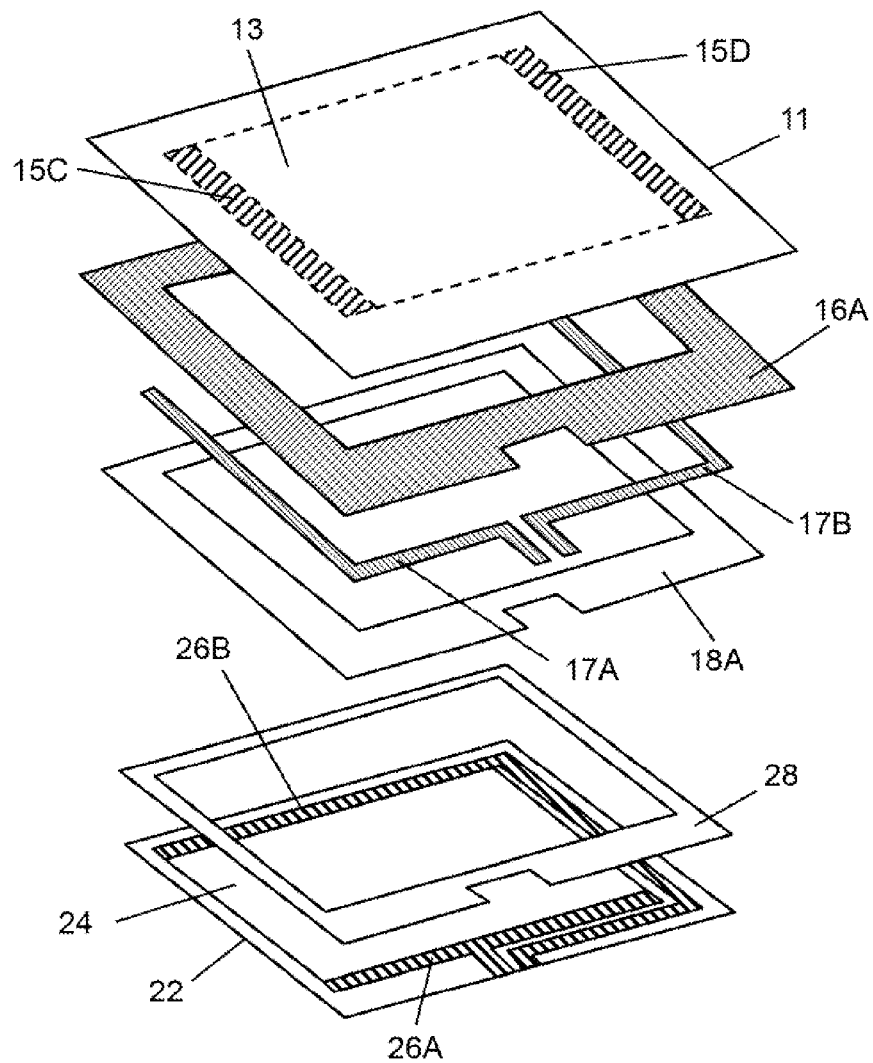
FIG. 4 is an exploded perspective view of the another touch panel according to the exemplary embodiment.

FIG. 3 is a sectional view of another touch panel according to the exemplary embodiment, and FIG. 4 is an exploded perspective view of the another touch panel. Upper substrate 11 has a pair of dark-colored upper electrodes 15C and 15D along the opposing first and second sides of upper conductive layer 13. The touch panel further includes insulating layer 16A formed by, for example, screen printing, outside upper electrodes 15C and 15D. Insulating layer 16A is frame-like and coats part of upper electrodes 15C and 15D. Insulating layer 16A is dark colored, and is preferably the same color as upper electrodes 15C and 15D.

Upper electrodes 15C, 15D and insulating layer 16A together form frame-like decoration part 11A along the outer periphery of the bottom surface of upper substrate 11. The touch panel further includes upper electrode 17A (fifth electrode) and upper electrode 17B (sixth electrode) on the bottom surface of upper electrodes 15C and 15D. Upper electrodes 17A and 17B are at least partially connected to upper electrodes 15C and 15D, respectively, and their ends extend to the center of the front side of upper substrate 11. Upper electrodes 17A and 17B may be made of silver or carbon. Thus, upper electrode 17A is formed along the first side of upper conductive layer 13 and connected to upper electrode 15C. Upper electrode 17B is formed along the second side of upper conductive layer 13 and connected to upper electrode 15D.

The touch panel further includes insulating layer 18A (third insulating layer) which is frame-like and coats upper electrodes 17A and 17B except for their ends. Insulating layer 18A may be made of polyester or epoxy.

Upper electrodes 15C and 15D at the left and right ends of upper conductive layer 13 are in a dark color such as black. The ends of upper electrodes 17A and 17B extend to the center of the front side of upper substrate 11, and are connected to the electronic circuit of the apparatus. Since upper electrodes 17A and 17B are made of silver or carbon, they have small resistance. Upper electrode 17A is coated with upper electrode 15C and insulating layer 16A. Upper electrode 17B is coated with upper electrode 15D and insulating layer 16A. Therefore, upper electrodes 17A and 17B do not necessarily have to be dark colored. In FIG. 4, upper electrodes 17A and 17B are disposed to partly correspond to upper electrodes 15C and 15D. However, upper electrode 17A has only to be partially connected to upper electrode 15C, while upper electrode 17B has only to be partially connected to upper electrode 15D.

In the present exemplary embodiment, one end in the width direction of upper electrode 15C and one end in the width direction of upper electrode 15D extend inward from the inner peripheries of adhesive 29 and insulating layer 28. As described above, the user sees the display device on the rear surface of the touch panel through light-transmitting part 11B from above upper substrate 11. In this case, dark-colored upper electrodes 15C and 15D serve as a screen to hide the inner peripheral ends of insulating layer 28 and other components from the user's view. This makes it easier for the user to see the display device on the rear surface and to operate the device.

Figure 5:
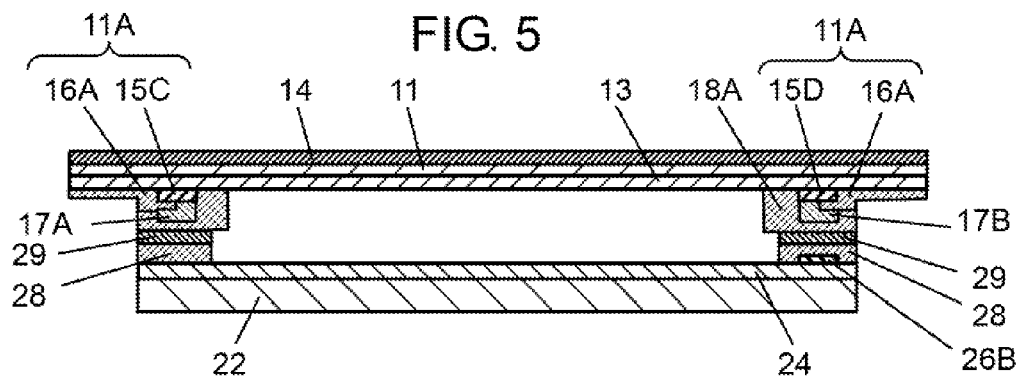
FIG. 5 is a sectional view of still another touch panel according to the exemplary embodiment.
Figure 6:
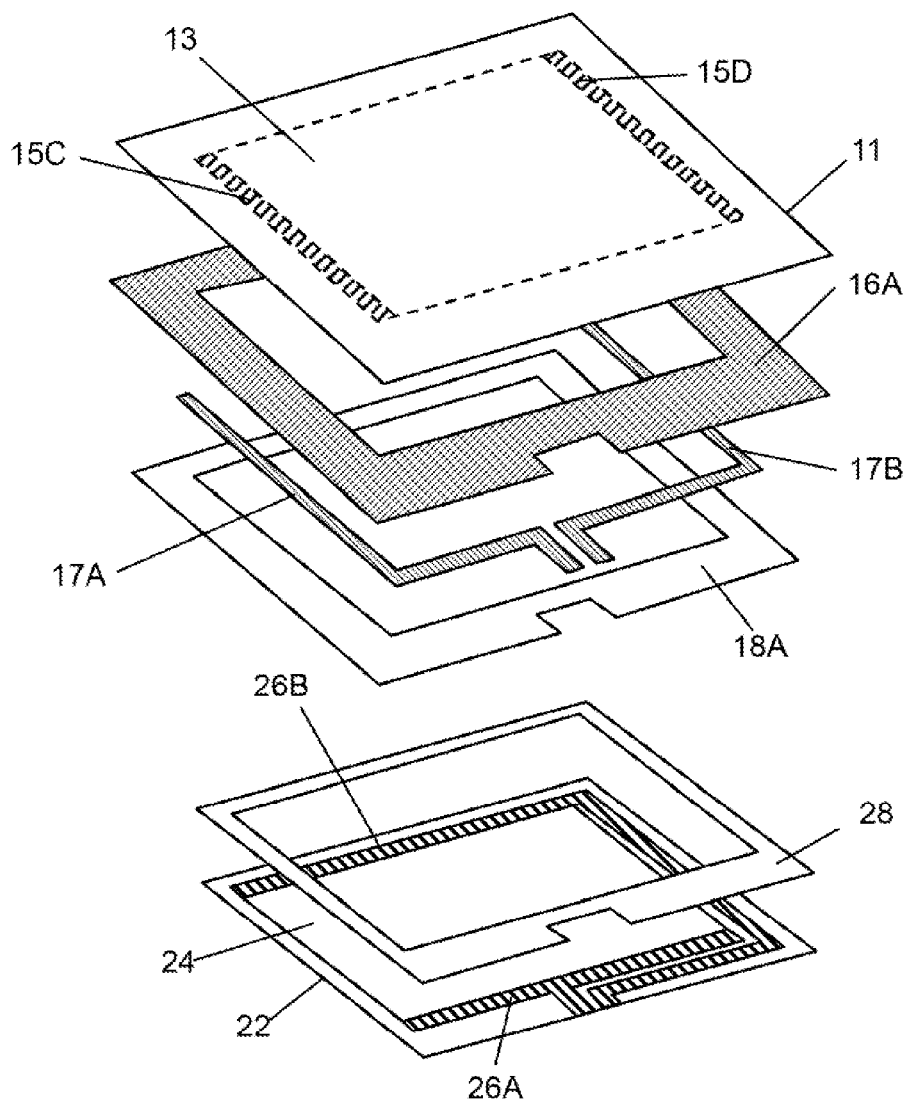
FIG. 6 is an exploded perspective view of the still another touch panel according to the exemplary embodiment.
Figure 7:
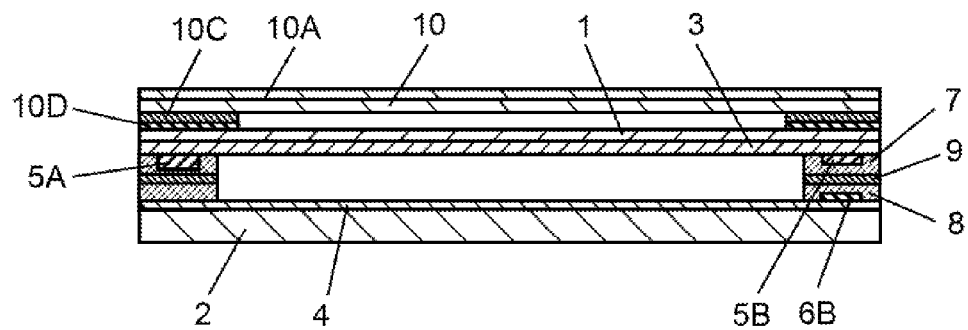
FIG. 7 is a sectional view of a conventional touch panel.
Figure 8:
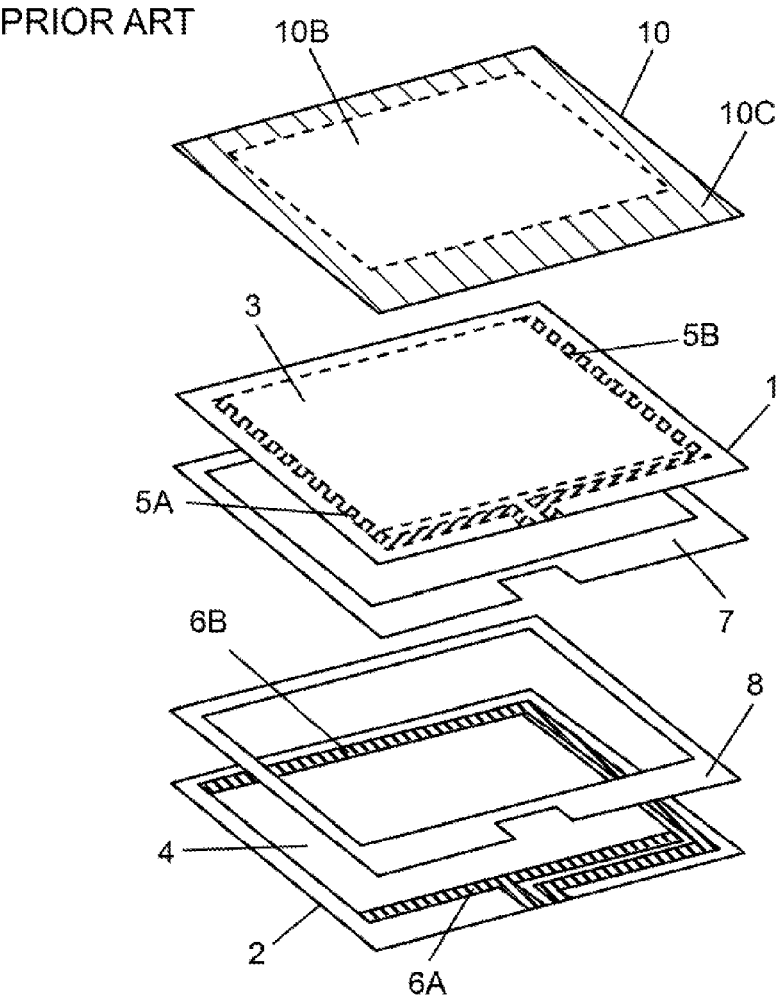
FIG. 8 is an exploded perspective view of the conventional touch panel.

FIG. 5 is a sectional view of still another touch panel according to the exemplary embodiment, and FIG. 6 is an exploded perspective view of the still another touch panel. In this touch panel, frame-like insulating layer 18A, which coats upper electrodes 17A and 17B except for their ends, extends more inward than in FIG. 4. As a result, insulating layer 18A coats the inner sides of upper electrodes 15C, 15D and 17A, 17B. This makes the touch panel electrically stable. Insulating layer 18A is also preferably dark colored.

As described hereinbefore, according to the present exemplary embodiment, upper electrodes 15A, 15B and 15C, 15D formed along the two opposing sides of upper conductive layer 13 are dark colored. In addition, frame-like dark-colored insulating layer 16 or 16A is formed along the outer periphery of the bottom surface of upper substrate 11. In this case, upper electrodes 15A, 15B and 15C, 15D, and insulating layer 16 or 16A together form decoration part 11A along the outer periphery of the bottom surface of upper substrate 11. Thus, the touch panel having decoration part 11A can be formed only by pasting upper substrate 11 and lower substrate 22 together. This eliminates the need for a display sheet and other components, allowing the touch panel with few components and easy assembly to be manufactured at low cost.

Thus, the touch panel of each of the foregoing embodiments is useful to operate various electronic apparatuses because of its features of simple structure, easy assembly, and low cost.

What is claimed is:

1. A touch panel comprising:
a first substrate including:
   a first conductive layer having a first side and a second side opposite the first side;
   a first electrode formed along the first side; and
   a second electrode formed along the second side;
a second substrate including:
   a second conductive layer facing the first conductive layer with a predetermined space provided therebetween, the second conductive layer having a third side and a fourth side both of which are orthogonal to the first side and the second side;
   a third electrode formed along the third side; and
   a fourth electrode formed along the fourth side; and
a first insulating layer disposed between the first substrate and the second substrate, wherein
the first insulating layer is in a shape of a frame and coats at least part of the first electrode and the second electrode; and
the first electrode, the second electrode, and the first insulating layer together form a decoration part, the decoration part having a color tone to prevent the third electrode and the fourth electrode from being visible when viewed from a first substrate side.

2. The touch panel of claim 1, wherein
the first electrode is made of insulating resin in which at least one of carbon and silver is dispersed.

3. The touch panel of claim 2, wherein
pigment is dispersed in the insulating resin.

4. The touch panel of claim 1, wherein
the first insulating layer is made of insulating resin in which pigment is dispersed.

5. The touch panel of claim 1, further comprising:
a second insulating layer between the first insulating layer and the second substrate, wherein
the decoration part has a color tone provided to conceal the third electrode, the fourth electrode, and the second insulating layer.

6. The touch panel of claim 5, wherein
an inner periphery of the decoration part is smaller than an inner periphery of the second insulating layer.

7. The touch panel of claim 1, further comprising:
a fifth electrode and a sixth electrode between the first insulating layer and the second substrate, the fifth electrode being formed along the first side and connected to the first electrode, and the sixth electrode being formed along the second side and connected to the second electrode.

8. The touch panel of claim 1, wherein
an end of each of the first and second electrodes is disposed to extend to a center of a front side of the first substrate.

9. The touch panel of claim 1, wherein
outer peripheries of the first substrate and the second substrate are adhered together.

10. The touch panel of claim 1, wherein
the first electrode, the second electrode and the first insulating layer are dark-colored.

11. The touch panel of claim 1, wherein
an outer periphery of the first substrate extends outward from an outer periphery of the second substrate.

* * * * *